(12) United States Patent
Frey

(10) Patent No.: US 8,714,345 B2
(45) Date of Patent: May 6, 2014

(54) LOOPED MATERIAL BAND PROVIDED WITH A SPLICE

(75) Inventor: Pierre-Regis Frey, Lutterbach (FR)

(73) Assignee: Tanals S.A.S., Masevaux (FR)

( * ) Notice: Subject to any disclaimer, the term of this patent is extended or adjusted under 35 U.S.C. 154(b) by 0 days.

(21) Appl. No.: 13/591,268

(22) Filed: Aug. 22, 2012

(65) Prior Publication Data

US 2013/0062168 A1    Mar. 14, 2013

(30) Foreign Application Priority Data

Sep. 8, 2011    (FR) ...................................... 11 57974

(51) Int. Cl.
    *F16G 3/02*    (2006.01)
(52) U.S. Cl.
    USPC ...................................... 198/844.2; 198/845
(58) Field of Classification Search
    USPC ............... 198/844.2, 845, 846; 474/204, 213, 474/250, 253–256; 24/31 F, 31 B, 31 L, 33 L, 24/33 R, 33 K, 38
    See application file for complete search history.

(56) References Cited

U.S. PATENT DOCUMENTS

| 3,744,095 | A | 7/1973 | Tomlinson | |
| 7,052,426 | B2 * | 5/2006 | Battat et al. | 474/253 |
| 7,594,574 | B2 * | 9/2009 | Mol et al. | 198/844.2 |
| 8,002,110 | B2 * | 8/2011 | DeGroot et al. | 198/844.2 |

FOREIGN PATENT DOCUMENTS

| EP | 2 108 860 A2 | 10/2009 |
| WO | 2007/090148 A2 | 8/2007 |
| WO | 2009/040628 A1 | 4/2009 |

OTHER PUBLICATIONS

French Search Report Corresponding to FR11/57974, Apr. 25, 2012.

* cited by examiner

*Primary Examiner* — Leslie A Nicholson, III
(74) *Attorney, Agent, or Firm* — Davis & Bujold, PLLC; Michael J. Bujold

(57) ABSTRACT

A looped material band (100) which includes at least one flat strip (2) having two reversible splice areas (3) in which the serrations (3a, 3b) only extend along a part of its width so that, when the material band is assembled in a loop around two pulleys (10a, 10b), the strands of the material band, which extend respectively between the two pulleys, are continuous and without any splice at least along a portion (9) of their width, regardless of the rotational position of the looped material band.

19 Claims, 5 Drawing Sheets

LOOPED MATERIAL BAND PROVIDED WITH A SPLICE

This application claims priority from French patent application serial no. 11/57974 filed Sep. 8, 2011.

FIELD OF THE INVENTION

The present invention relates to a looped material band such as in particular a power transmission belt, a conveyor belt, a conveyor or similar, including at least one flat strip having at least one reversible splice area allowing assembling and disassembling said looped material band, said reversible splice area comprising at least two serrations with complementary shapes that can be engaged into each other, provided each in the plane of an end of said flat strip, said serrations comprising each at least one tooth delimited by a perimeter and arranged in order to be crossed, after engaging them, by at least one removable transversal connecting pin that allows locking and unlocking said splice area.

BACKGROUND OF THE INVENTION

Many areas of industry use looped material bands, either as power transmission elements such as belts or as transport elements such as conveyor belts, conveyors, etc. These material bands present classically a structure and technical characteristics specifically adapted according to the intended application.

The power transmission belts are classically made from materials designed to improve their fatigue life and resist all mechanical, physical and/or chemical stress they are commonly subjected to in operation. Among the power transmission belts presently available on the market, those marketed under the name PolyChain® and manufactured out of a light and robust polyurethane compound distinguish themselves by their excellent mechanical performance and their very high fatigue resistance. Such transmission belts are in particular four times more resistant than the traditional belts, since they are reinforced with spirally wound tensile cords, for example made of carbon or Kevlar®, embedded in their thickness. They have the shape of endless sleeves manufactured under a press in a form whose diameter determines their length, these sleeves being then cut or slit according to the required width of every belt. Due to such an endless structure, without splice area, the mechanical resistance properties of such transmission belts are advantageously preserved. They nevertheless have the disadvantage that their installation on a machine, as well as their removal for replacement, requires the disassembly of the machine, or even the intervention of the manufacturer of the machine, imposing a stoppage of the machine, which is detrimental to the profitability of the production equipment. At the moment, the handling operations of such transmission belts, whether of the PolyChain® type or of any other type, having the shape of endless sleeves, show consequently to be particularly laborious, time-consuming and costly.

The reversible splice solutions commonly used in the area of conveyor belts and described in a number of publications do not show to be totally satisfactory when they are transposed as such on power transmission belts such as those described previously, which presuppose, as mentioned, a structure able to resist mechanical stress, due in particular to the high power torques to transmit and to a high rotational speed, both being markedly higher than those found in the conveying branch.

So, publication EP 2 108 860, relating to a looped material band intended for being used as a conveyor belt, provides to equip said belt with a splice area comprising two serrations to be engaged into each other, obtained by stamping, and in which the teeth are delimited by a rectangular perimeter and have different lengths so that the ends of the teeth are offset longitudinally with respect to each other. The main disadvantage of this solution, when it is implemented within the framework of a power transmission belt, is due to the fact that the shape offered for said teeth has sharp angles. Even though such a feature is very well adapted for a conveyor belt, classically made out of a material such as extruded polyurethane reinforced with longitudinal steel tensile cords, it appears that the presence of any sharp angle reduces drastically the lifetime of a transmission belt, in particular of the PolyChain® type, made of comparatively harder polyurethane and whose spirally wound tensile cords are more flexible. Furthermore, a splice area in which the ends of the teeth show a longitudinal offset requires also more connecting pins, which makes the assembly of such a splice less easy. In addition, the polyurethane used for a power transmission belt of the PolyChain® type is so hard that the classical stamping tools wear very quickly and lose their shape, and thus do not allow reproducing with a sufficient accuracy the complementary shapes of the serrations of the splice area, therefore penalizing the mechanical resistance of the splice.

Another solution, described in publication U.S. Pat. No. 3,744,095, provides to equip the ends of a transmission belt comprising longitudinal tensile cords with dado-shaped serrations intended to be assembled with threaded connecting pins. The disadvantage of such a dado cut lies not only in the presence of sharp angles on the serrations, but also in the fact that all cords are cut at the same level, aligned over the whole width of the belt, the fatigue of which is then strongly favored. Even though the dado shape of the serrations proposed by this publication is suitable in the case of longitudinal cords, it cannot be transposed to a power transmission belt, in particular of the PolyChain® type, in which the cords are wound spirally. The cuts parallel to the longitudinal edges of the belt performed when stamping the serrations imply cutting longitudinally at least one spirally wound cord, which results in reducing the fatigue life of said belt in the splice area.

SUMMARY OF THE INVENTION

The present invention aims to remedy these disadvantages by offering a looped material band having at least one reversible splice area arranged so as to allow its assembly and disassembly on site and to preserve the mechanical resistance and fatigue life properties of the looped material band, so that it can compete in terms of resistance with any other material band without splice and suits for a use both as a power transmission belt and as a conveyor or similar. Another goal of the invention is to propose a looped material band comprising at least one splice area whose production is optimized, does not lead to a premature deterioration of the tooling and produces serrations having a shape of a perfect accuracy.

To that purpose, the invention relates to a looped material band of the type described in the preamble, characterized in that it comprises at least two splice areas in which said serrations extend on a part only of its width so that, when said material band is assembled in a loop around two pulleys, the strands of said material band, which extend respectively between the two pulleys, are continuous and without splice on at least a portion of their width, whatever the position in rotation of said looped material band.

In a first embodiment variant, the serrations of a first splice area are offset laterally and longitudinally with respect to the serrations of the second splice area so that, when said material band is assembled in a loop, said first and second splice areas are diametrically opposite.

In this variant, said material band can comprise a flat strip provided with said first and second splice areas, which extend each over a part of the width of said flat strip.

Said material band can also comprise a first flat strip provided with said first splice area and a second flat strip provided with said second splice area, said first and second flat strips being arranged side by side and in such a way with respect to each other that, when said ends of said first and second flat strips are assembled, said first and second splice areas are diametrically opposite.

In a second embodiment variant, said material band comprises a flat strip provided with two splice areas that extend each over a width smaller than half the width of said flat strip, the serrations of a first splice area being offset laterally with respect to the serrations of the second splice area so that, when said material band is assembled in a loop, said first and second splice areas are aligned in the width of said material band and delimit between them a central portion that is continuous and without splice.

In a third embodiment variant, said material band comprises a flat strip provided with three splice areas that extend each over a width smaller than the third of the width of said flat strip, the serrations of said splice areas being offset laterally and aligned in a chevron arrangement so that, when said material band is assembled in a loop, the three splice areas are aligned in the width of said material band, are symmetrical with respect to the centerline of said flat strip and delimit between them two intermediate portions that are continuous and without splice.

The serrations of said splice areas comprise at least one tooth, said tooth being delimited by a perimeter with an asymmetric shape with respect to the longitudinal axis of said tooth parallel to the centerline of said flat strip.

According to an embodiment variant, the periphery of said tooth comprises at least one straight line portion that is substantially parallel to the longitudinal edges of said flat strip.

In compliance with another embodiment variant, the perimeter of said tooth has substantially the shape of a rectangular triangle whose top is rounded.

The present invention is also characterized in that said perimeter of said tooth comprises at least one shoulder with rounded angles.

On the other hand, if the serrations of said splice areas comprise several teeth, the teeth of a same splice area can be aligned and can have equal lengths.

BRIEF DESCRIPTION OF THE DRAWINGS

The present invention and its advantages will be better revealed in the following description of several embodiments given as non limiting examples, in reference to the drawings in appendix, in which.

DETAILED DESCRIPTION OF THE PREFERRED EMBODIMENTS

Figure 1:
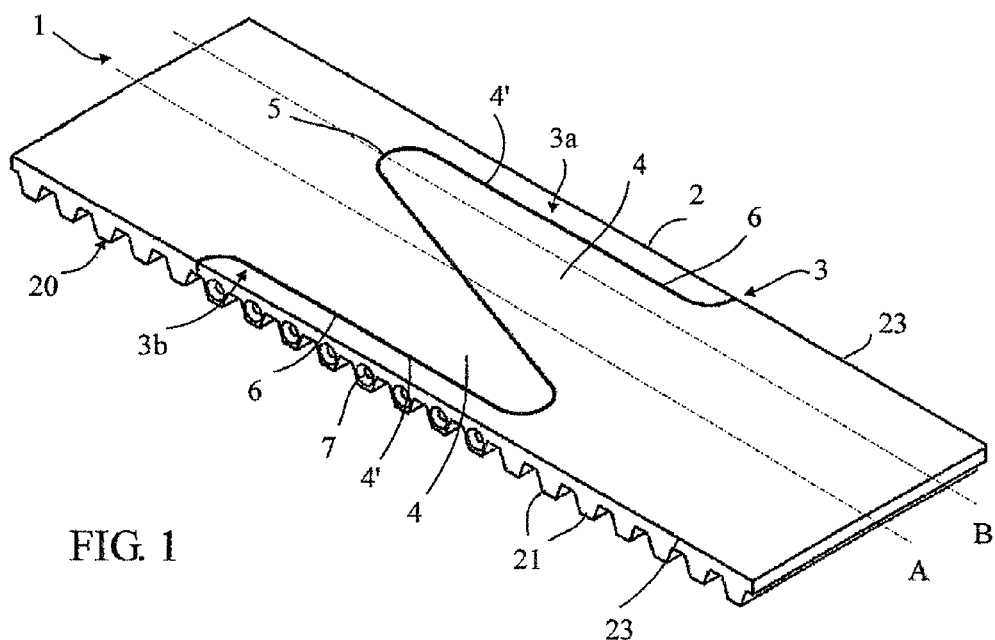
FIGS. 1 and 2 represent perspective views of a splice area in two looped material bands of different widths comprising teeth compliant with a first embodiment variant of the invention.

With reference to the figures, the present invention relates to a looped material band 1, 10, 100, 110, 120, 130 comprising at least one flat strip 2 made, in the illustrated examples, out of a material such as polyurethane or of the Neoprene® type or similar. Such a material has advantageously the mechanical characteristics required to resist the stress a material band 1, 10, 100, 110, 120, 130 is subjected to, regardless whether it is used as a conveyor belt or as a power transmission belt. In the illustrated examples, the flat strip 2 presents on its lower side 20 a surface equipped with notches 21 arranged so as to cooperate with notched pulleys 10a, 10b (see FIGS. 7 and 8). It further comprises a tension core made of a plurality of (not represented) spiral-wound cords embedded in its thickness, made for example out of carbon, steel, stainless steel, glass fiber or Kevlar® arranged parallel to each other and inclined with respect to the longitudinal edges 23 of said flat strip 2. Of course, the invention also applies to a material band 1, notched or not, in which the flat strip 2 is made out of a material different from those previously mentioned, such as for example thermoplastic polyurethane, or any other equivalent synthetic and/or composite material. Likewise, the cords embedded in the flat strip 2 can also be made of a material such as for example steel, glass fiber or any equivalent material and they can extend parallel to each other and to the longitudinal edges 23 of said flat strip 2. Finally, such a material band 1 could also include a textile tensile core and/or a textile external structure.

Classically, the flat strip 2 has at least one reversible splice area 3, 30 allowing the assembly and disassembly of said looped material band 1, 10, 100, 110, 120, 130 on site. This splice area 3, 30 comprises at least two serrations 3a, 3b, 30a, 30b that can be engaged into each other, having complementary shapes, formed each for example by stamping or by any other equivalent process, in the plane of the ends of said flat strip 2. These serrations 3a, 3b, 30a, 30b comprise transversal passages 7, for example in the form of smooth bores, arranged to be crossed each, after the engaging of the serrations 3a, 3b, 30a, 30b, by a removable transversal pin 22 (see FIG. 5) that allows locking and unlocking the splice area 3, 30. On the other hand, the serrations 3a, 3b, 30a, 30b comprise each at least one tooth 4, 40, delimited by a perimeter 4', 40' whose angles are preferably rounded. The number of teeth 4, 40 of a serration 3a, 3b, 30a, 30b is in particular determined by the width of the flat strip 2. The serrations 3a, 3b, 30a, 30b illustrated in FIGS. 2 and 4 comprise more teeth 4, 40 than the ones illustrated in FIGS. 1 and 3, formed on a narrower flat strip 2. If the serrations comprise several teeth, these teeth 4, 40 are preferably aligned and have the same length.

In compliance with the invention, and as illustrated in FIGS. 1 to 12, the periphery 4', 40' of the teeth 4, 40 has an asymmetric shape with respect to the longitudinal axis B of each tooth parallel to the centerline A of the flat strip 2, while this shape may vary according to different embodiment variants, in function of the final application of the looped material band 1 and of the physical characteristics desired for the flat strip 2. Such an asymmetric shape of the teeth 4, 40 allows advantageously to optimize the cut of the teeth in the width of the flat strip 2, and to facilitate later the drilling of the transversal passages 7 by means of classical tooling.

Figure 2:
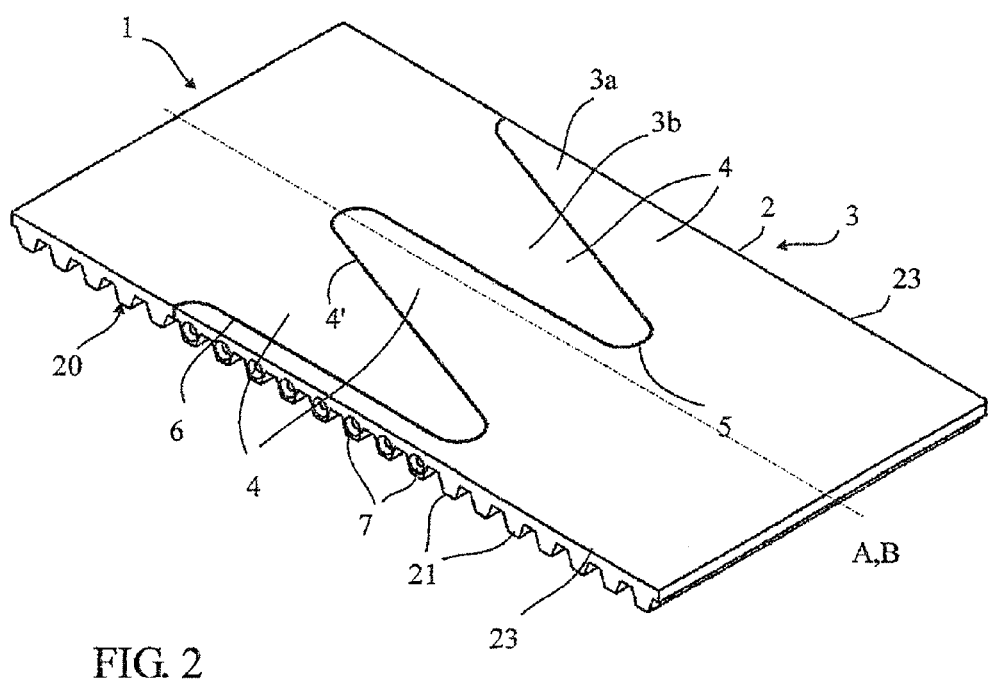

In the embodiment variant illustrated in FIGS. 1 and 2, the serrations 3a, 3b of the splice area 3 extend over the whole width of the flat strip 2, while the teeth 4 present substantially the shape of a rectangular triangle whose top 5 is rounded, and a side 6 of which is parallel to the longitudinal edges 23 of the flat strip 2. The stamping of the ends of the flat strip 2 in order to produce the serrations 3a, 3b whose teeth 4 present such a triangular shape leads advantageously to cut at different lengths the tensile cords arranged in the thickness of the flat strip 2 in an inclined way with respect to the longitudinal edges 23 of the latter. Thus, the free ends of the tensile cords, extending inside of the teeth 4, are not aligned with respect to each other. Such a characteristic contributes to improve the fatigue life of the looped material band 1 by increasing the resistance of the weak point and of the flexural rigidity break point located at the limit of the splice area 3. On the other hand, a triangular shape allows a better ejection of the flat strip 2 after the stamping stage of its ends in order to produce the serrations 3a, 3b. This allows improving the cutting accuracy of the two serrations 3a, 3b, and ensuring the respect of their complementary shapes, while limiting the deformation of the stamping tools.

On the other hand, since the top 5 of the teeth 4 is rounded, the serrations 3a, 3b do not have any sharp angle, which also contributes to improve the fatigue life of the looped material band 1. This appears particularly in the embodiment variants such as the ones illustrated, in which the flat strip 2 is made of a very hard polyurethane while the tensile cords, made of carbon or Kevlar® are flexible, such materials being particularly suitable for an use of the looped material band 1 as a power transmission belt.

Figure 3:
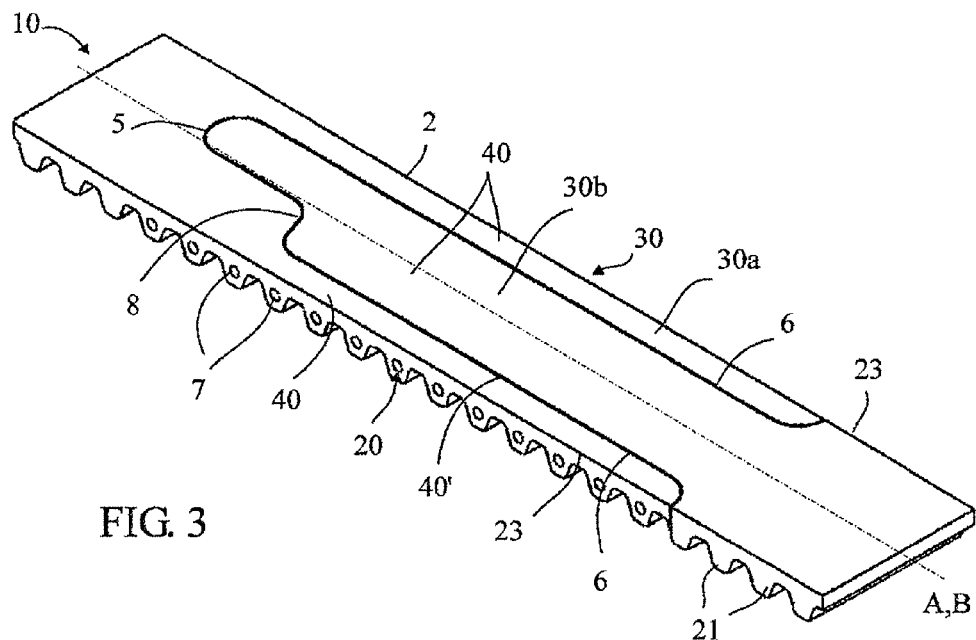
FIGS. 3 and 4 represent perspective views of a splice area in two looped material bands of different widths comprising teeth compliant with two other embodiment variants of the invention.

The embodiment variant illustrated in FIG. 3 suits more particularly for a looped material band 1 obtained from a flat strip 2 having a width so small that the serrations 30a, 30b of the splice area 30 cannot comprise more than one tooth 40. In this case, a tooth with a triangular shape is difficultly achievable by stamping. So, in order to make sure that, after the stamping step of the ends of the flat strip 2, the tensile cords are cut at different lengths and their free ends are not aligned with respect to each other, the present invention provides to give to the tooth 40 of one of the serrations 30b an elongated general shape in which its perimeter 40' comprises a rounded top 5 and at least one shoulder 8. In this case, the other serration 30a comprises two half-teeth 40 distributed on either side of the tooth 40 of the serration 30b. Of course, such a shape of the tooth 40 is also suitable for a flat strip 2 with a larger width (see FIGS. 4 and 5). In this case, the serrations 30a, 30b of the splice area 30 can comprise teeth 40 with one shoulder 8 or several shoulders 8, these shoulders 8 being preferably offset for every tooth 40 in order to avoid cutting all tensile cords at the same level and thus preventing any important interruption in rigidity. As in the previous example, such a shape of the tooth 40 with at least one shoulder 8 also allows a better ejection of the flat strip 2 after the step of stamping its ends in order to produce the serrations 30a, 30b. The advantages defined by the improvement of the cutting accuracy of the two serrations 30a, 30b, the respect of their complementary shapes and the preservation of the stamping tools consequently also appear within the framework of these embodiment variants. Of course, these tooth shape examples are not restrictive and extend to any other asymmetric shape allowing reaching the same technical goals.

The splice areas 3, 30 of the embodiment variants illustrated in FIGS. 1 to 5 can be locked and unlocked by means of transversal connecting pins 22 (see FIG. 5) introduced in a reversible way in the transversal passages 7. Depending on the applications of the looped material band 1, said transversal connecting pins 22 can be introduced in said transversal passages 7 all from only one of the longitudinal edges 23 of the flat strip 2, or some from one of said longitudinal edges 23 and other ones from the other longitudinal edge 23. In this last case, and assuming that the locking pins 22 are all sufficiently long to extend through the whole width of the flat strip 2, their introduction from the two longitudinal edges 23 allows limiting the opening of the teeth 4, 40 and consequently increasing the mechanical resistance of the splice area 3, 30.

On the other hand, the transversal connecting pins 22 can be made of standard screws, for example of the self-tapping type, provided with standard heads seated in a first bore made in the flank of said flat strip 2, in order to be accessible for a tool provided with a standard screwing socket and avoid damaging the pulleys 10a, 10b. A screw-nut type assembly that allows preventing any unexpected opening of the splice area 3, 30 may also be considered, the nut being located in a second bore made in the opposite flank of said flat strip 2.

Figure 4:
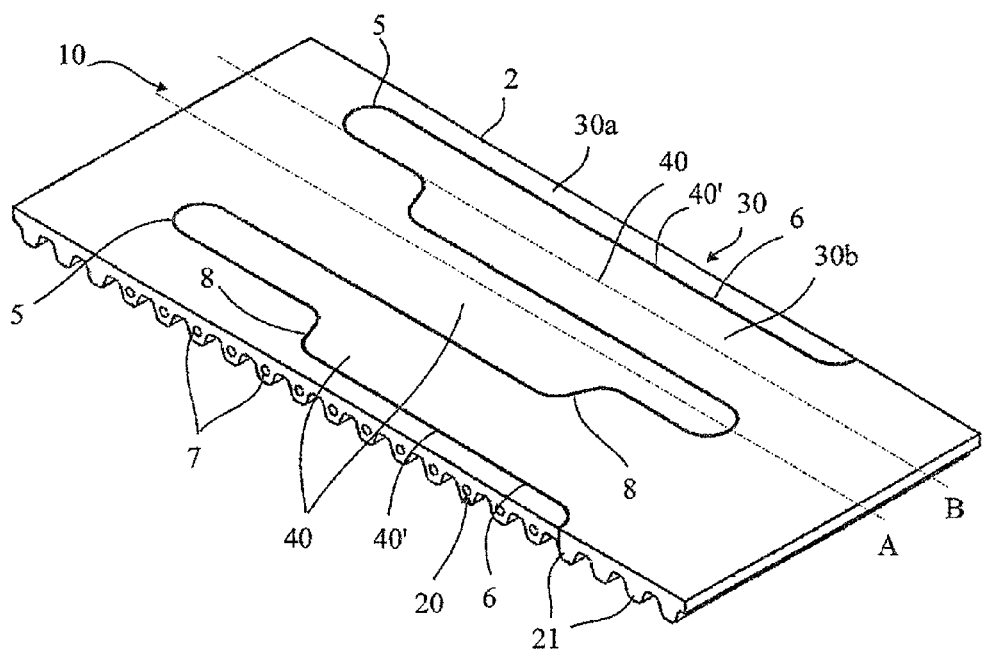
Figure 5:
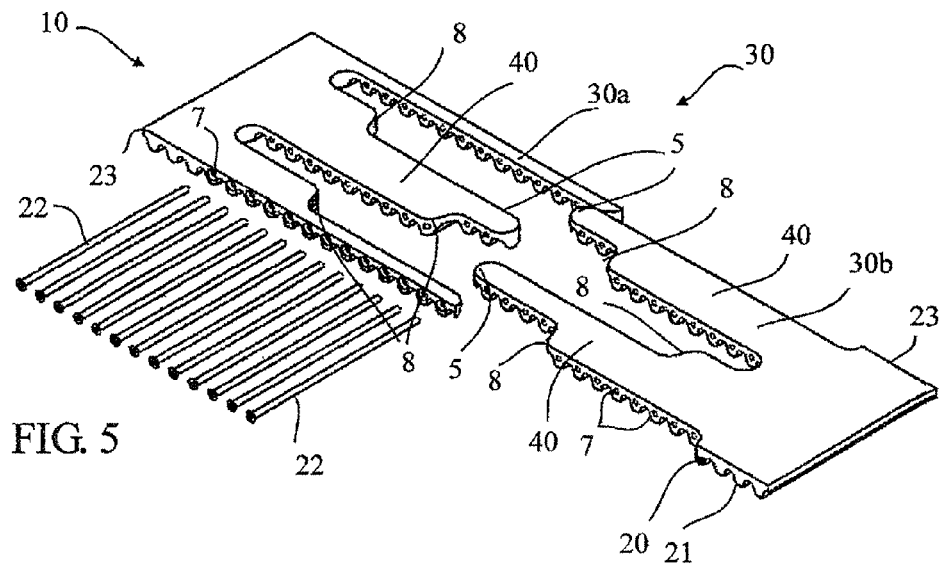
FIG. 5 represents a perspective view of the material band illustrated in FIG. 4 before assembling the splice area.
Figure 6:
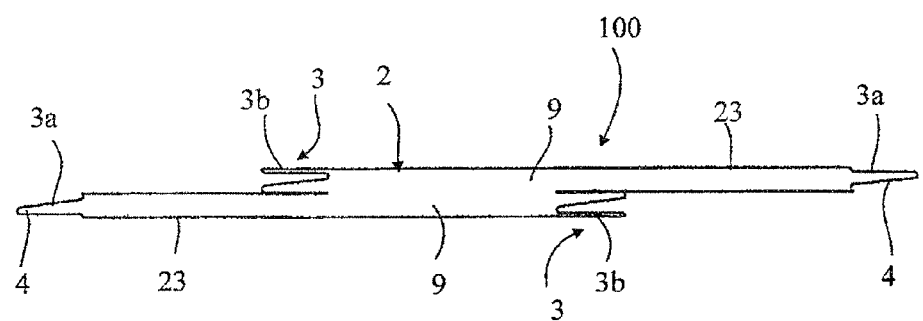
FIG. 6 represents a top view of a flat strip arranged to form the looped material band represented in FIG. 7 comprising two splice areas located diametrically opposite.
Figure 7:
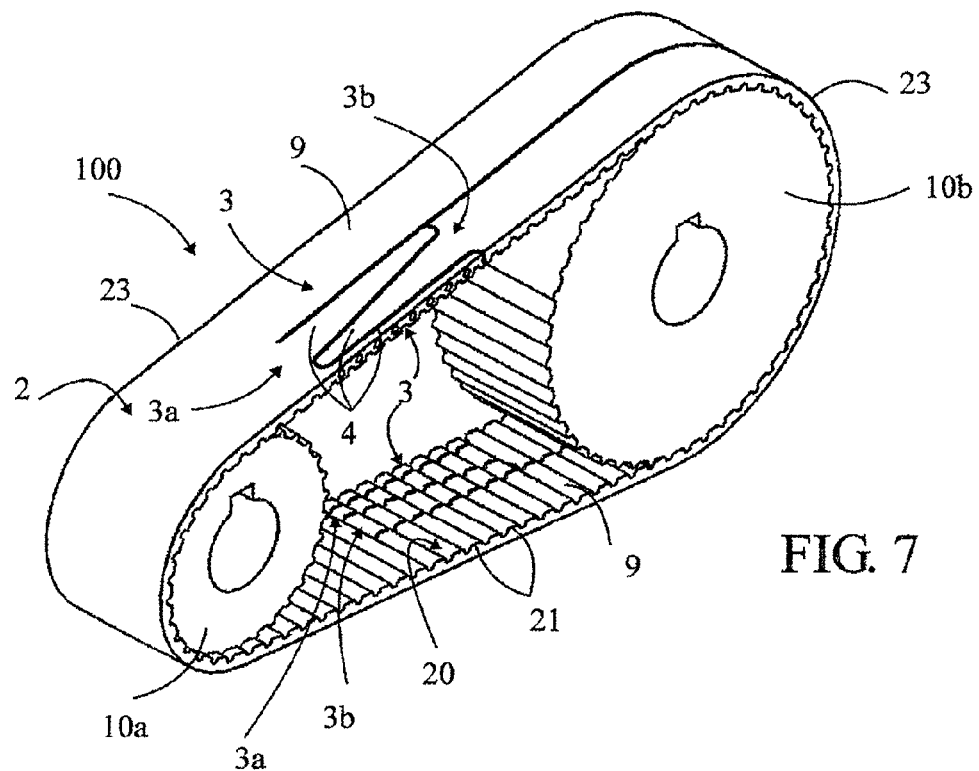

FIG. 6 illustrates a flat strip 2 comprising two splice areas 3, according to the embodiment illustrated in FIGS. 1 and 2 for example, or any other equivalent splice form, such as that illustrated in FIGS. 3 to 5. The two splice areas 3 are offset laterally and longitudinally with respect to each other, and the serrations 3a, 3b of each splice area 3 extend on only a section of the width of said flat strip 2, for example on half of said width. Such a flat strip 2 allows obtaining a looped material band 100 such as illustrated in FIG. 7 comprising two splice areas 3 diametrically opposite. Thanks to this specific construction, when the material band 100 is assembled in a loop around two pulleys 10a, 10b according to FIG. 7, the strands of this belt that extend respectively between the two pulleys 10a, 10b, that is to say one strand under load and one slack strand, are continuous and without splice on at least a portion 9 of their width, whatever the position in rotation of the looped material band 100. The splice areas 3 are thus less loaded and age much less, which allows extending the lifetime of the looped material band 100 or, at least, not penalizing this lifetime. This solution allows competing in terms of resistance with all continuous transmission belts without splice.

Figure 8:
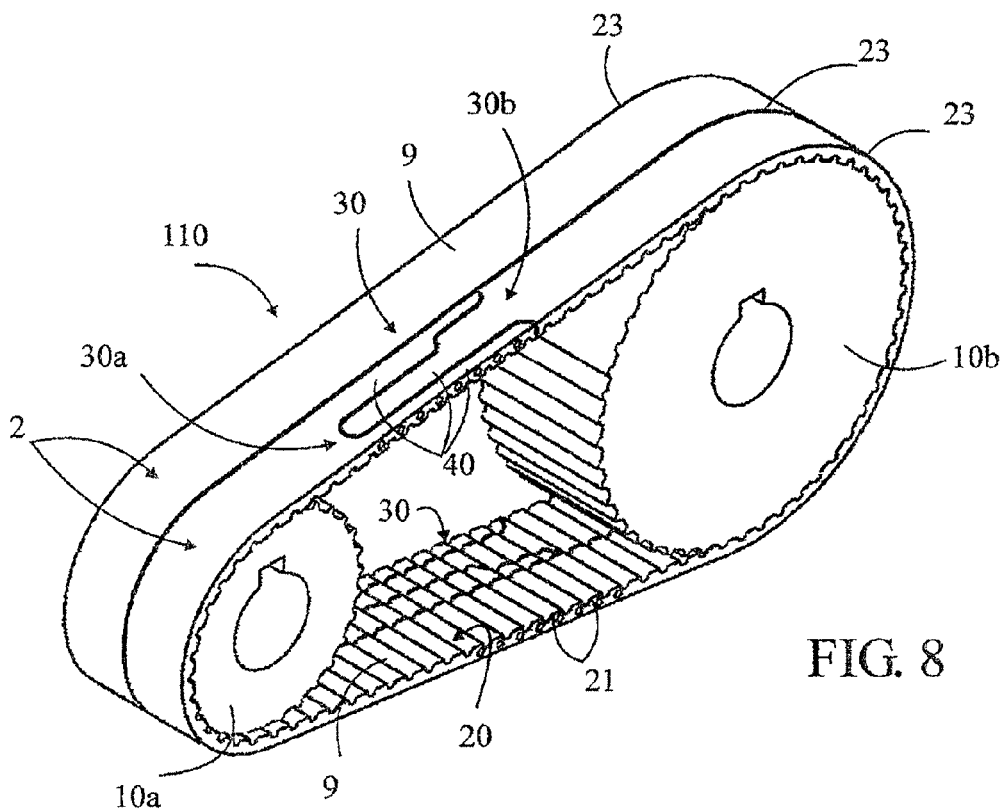
FIG. 8 represents an embodiment variant of the looped material band illustrated in FIG. 7.

An equivalent result, that is easier to achieve, can be reached by means of a material band 110 represented in FIG. 8 comprising two flat strips 2, that is to say a first flat strip 2 equipped with a first splice area 30 and a second flat strip 2 equipped with a second splice area 30. Each splice area 30 can correspond to the embodiment represented in FIGS. 3 to 5, or to any equivalent splice form such as that illustrated in FIGS. 1 and 2, and extends on the width of the concerned flat strip 2. In this case, the first and second flat strips 2 are arranged side by side along their common longitudinal edge 23, and in such a way with respect to each other that, when said ends of said first and second flat strips 2 are assembled, said first and second splice areas 30 are diametrically opposite. As in the previous example, when the material band 110 is assembled in a loop around two pulleys 10a, 10b, the strands of this band that extend respectively between the two pulleys 10a, 10b are continuous and without splice on at least a portion 9 of their width, whatever the position in rotation of the looped material band 110.

The embodiments according to FIGS. 7 and 8, which comprise a splice area 3, 30 in each of the strands of the looped material band 100, 110, require to have access to these two strands. Now, on some installations, mounting these material bands 100, 110 is not possible.

To overcome this lack, FIGS. 9 to 12 illustrate two other embodiments of a looped material band 120, 130 in which the splice areas 3, 30 are concentrated in one single strand.

Figure 9:
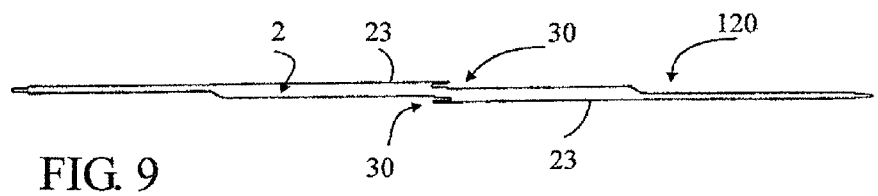
FIG. 9 represents a top view of a flat strip according to another embodiment, arranged to form the looped material band represented in FIG. 10 comprising two aligned splice areas.
Figure 10:
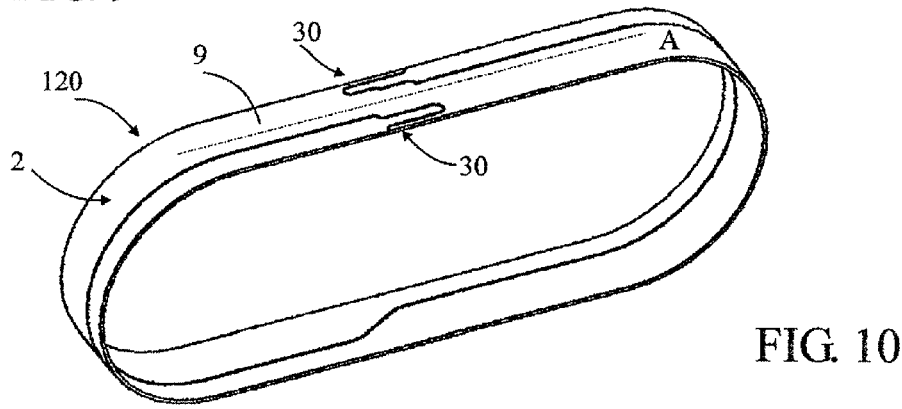

FIG. 9 illustrates a first embodiment of a flat strip 2 to form the looped material band 120 illustrated in FIG. 10, comprising two splice areas 30, made for example according to the variant illustrated in FIGS. 3 to 5 or according to any other equivalent variant such as that illustrated in FIGS. 1 and 2, offset laterally and extending each on a width smaller then half the width of the flat strip 2. So, when the ends of the flat strip 2 are assembled to form the material band 120, the two splice areas 30 are aligned in the width of said band, arranged on both sides of the centerline A of the flat strip 2, and delimit between them a continuous median portion 9, without splice, offering the same advantages in terms of resistance as the previous examples.

Figure 11:
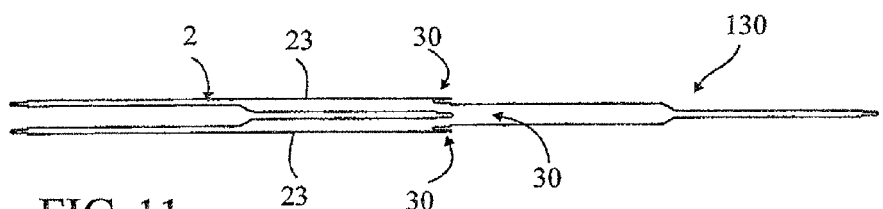
FIG. 11 represents a top view of a flat strip according to yet another embodiment, arranged to form the looped material band represented in FIG. 12 comprising three splice areas in a chevron alignment.
Figure 12:
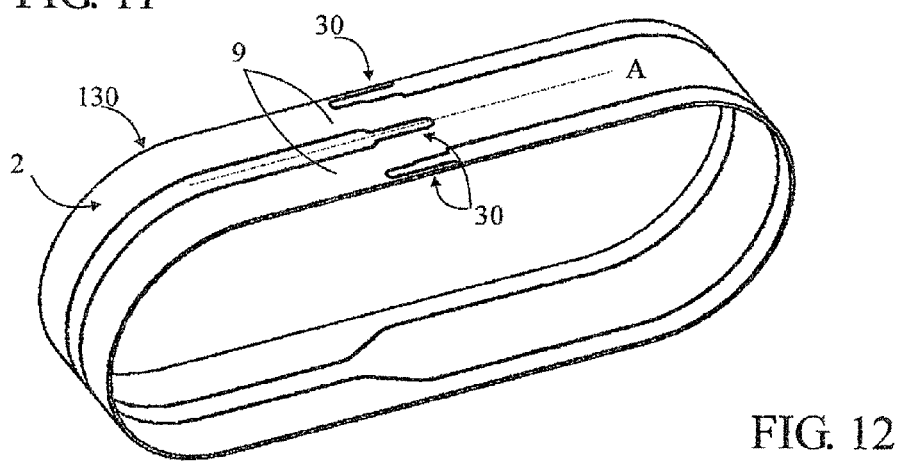

FIG. 11 illustrates a second embodiment of a flat strip 2 to form the looped material band 130 illustrated in FIG. 12 comprising three splice areas 30, made for example according to the variant illustrated in FIGS. 3 to 5 or according to any other equivalent variant such as that illustrated in FIGS. 1 and 2, offset laterally, aligned in a chevron arrangement and extending over a width smaller than the third of the width of the flat strip 2. So, when the ends of the flat strip 2 are assembled to form the material band 130, the three splice areas 30 are aligned in the width of said band, arranged symmetrically with respect to the centerline A of the flat strip 2, and delimit between them two continuous intermediate portions 9, without splice, offering the same advantages in terms of resistance as the previous examples. Furthermore, this symmetrical construction allows balancing the efforts in the material strip 130 obtained, which suits therefore particularly for high-speed or high-power installations.

POSSIBILITIES FOR INDUSTRIAL APPLICATION

This description shows clearly that the invention allows reaching the goals defined, that is to say, offer a looped material band 100, 110, 120, 130 that can be assembled thanks to its splice areas 3, 30, that offers optimized mechanical resistance and fatigue life, allowing therefore competing with any other belt without splice in terms of mechanical resistance, that can be used both as a power transmission belt or as a conveyor belt, and that can also apply to all materials and structures known and to come. The mechanical performance achieved is such that it is possible, in certain cases, to reduce the width of the original belts.

On the other hand, the splice areas 3, 30 of the conveyor belt according to the invention have advantageously characteristics such that their manufacture can be achieved with high accuracy while sparing the tooling used and slowing down its wear.

The present invention is not restricted to the examples of embodiment described, but extends to any modification and variant which is obvious to a person skilled in the art while remaining within the scope of the protection defined in the attached claims.

The invention claimed is:

1. A looped material band (1, 10, 100, 110, 120, 130) for one of a power transmission belt, a conveyor belt, a conveyor or a similar component, the material band (1, 10, 100, 110, 120, 130) comprising:
at least one flat strip (2) having at least one reversible splice area (3, 30) allowing for assembling and disassembling of the material band (1),
the reversible splice area (3, 30) comprising at least two serrations (3a, 3b, 30a, 30b) with complementary shapes that can engage together with one another, provided each in a plane of an end of the flat strip (2), and
the serrations (3a, 3b, 30a, 30b) comprising each at least one tooth (4, 40) delimited by a perimeter and arranged in order to be crossed, after engagement, by at least one removable transversal connecting pin (22) that allows locking and unlocking the splice area (3, 30, 31, 300),
wherein the material band comprises at least two splice areas (3, 30) extending only along a portion of its width, the at least two splice areas are offset at least one of laterally and longitudinally with respect to one another so that when the material band is assembled in a loop around at least two pulleys (10a, 10b), the strands of the material band, which extend respectively between the two pulleys, are both continuous and without any splice on at least a portion (9) of their width, regardless of a rotational position of the material band with respect to the two pulleys.

2. The material band according to claim 1, wherein a first splice area (3, 30) is offset laterally and longitudinally with respect to second splice area (3, 30) so that, when the material band is assembled in a loop, the first and second splice areas (3, 30) are located diametrically opposite one another.

3. The material band according to claim 2, wherein the material band comprises the flat strip (2) provided with the first and second splice areas (3, 30) which extend each over a portion of the width of the flat strip.

4. The material band according to claim 2, wherein the material band comprises a first flat strip (2) provided with the first splice area (3, 30) and a second flat strip (2) provided with the second splice area (3, 30), and the first and second flat strips (2) are arranged side by side and in such a way with respect to one another that, when the ends of the first and the second flat strips (2) are assembled, the first and second splice areas (3, 30) are located diametrically opposite one another.

5. The material band according to claim 2, wherein when the material band is assembled in a loop, the first splice area (3, 30) is located adjacent a first lateral side of the loop and the second splice area (3, 30) is located adjacent an opposite second lateral side of the loop.

6. The material band according to claim 1, wherein the material band comprises the flat strip (2) provided with two splice areas (3, 30) that extend each over a width smaller than half a width of the flat strip, a first splice area (3, 30) is offset laterally with respect to a second splice area (3, 30) so that, when the material band is assembled in a loop, the first and the second splice areas (3, 30) are aligned in the width of the material band and delimit a central portion (9) therebetween that is continuous and without any splice.

7. The material band according to claim 1, wherein the material band comprises the flat strip (2) provided with three splice areas (3, 30) that each extend over a width smaller than a third of the width of the flat strip, the splice areas (3, 30) are offset laterally and aligned in a chevron arrangement so that, when the material band is assembled in a loop, the three splice areas (3, 30) are aligned in the width of the material band, are symmetrical with respect to a centerline (A) of the flat strip and delimit two intermediate portions (9) therebetween that are continuous and without any splice.

8. The material band according to claim 1, wherein the serrations (3*a*, 3*b*, 30*a*, 30*b*) of the splice areas (3, 30) comprise at least one tooth (4, 40), the at least one tooth (4, 40) is delimited by a perimeter (4', 40') with an asymmetric shape with respect to the longitudinal axis (B) of the tooth (4, 40) parallel to the centerline (A) of the flat strip (2).

9. The material band according to claim 8, wherein a periphery (4', 40') comprises at least one straight line portion (6) that is substantially parallel to the longitudinal edges (23) of the flat strip (2).

10. The material band according to claim 8, wherein the at least one tooth (4) substantially has a shape of a rectangular triangle with a rounded top (5).

11. The material band according to claim 8, wherein a periphery (4', 40') of the at least one tooth (4, 40) comprises at least one shoulder (8) with rounded angles.

12. The material band according to claim 8, wherein the serrations (3*a*, 3*b*, 30*a*, 30*b*) of the splice areas (3, 30) comprise a plurality of teeth (4, 40), and the plurality of teeth (4, 40) are aligned with one another and have equal lengths.

13. The material band according to claim 1, wherein the perimeter of each tooth is spaced both longitudinally and laterally from the perimeter defining any other tooth of the material band.

14. The material band according to claim 1, wherein a central portion of the flat strip has a width which is equal to a width of the material band while each opposed end of the flat strip has a width which is less than the width of the material band.

15. The material band according to claim 1, wherein a width of a central portion of the flat strip is greater than a width at each opposed end of the flat strip.

16. The material band according to claim 1, wherein at least one tooth comprises at least on one shoulder (8) which alters a width of the at least one tooth.

17. The material band according to claim 1, wherein the perimeter comprises a single perimeter which defines each tooth of the material band, and the single perimeter commences at a first lateral edge of the material band, completely circumscribes the two pulleys (10*a*, 10*b*) and terminates at an opposed second lateral edge of the material band.

18. The material band according to claim 1, wherein the perimeter comprises a single perimeter which extends generally along a center line of the flat strip from adjacent a first end of the flat strip to adjacent an opposed second end of the flat strip.

19. The material band according to claim 1, wherein the perimeter comprises a single perimeter which defines at least a first tooth adjacent a first end of the flat strip and defines at least a second tooth adjacent an opposed second end of the flat strip, and the perimeter extends generally along a center line of the flat strip from adjacent the first end to adjacent the second end of the flat strip.

* * * * *